(12) United States Patent
Sinclair et al.

(10) Patent No.: US 7,395,384 B2
(45) Date of Patent: Jul. 1, 2008

(54) METHOD AND APPARATUS FOR MAINTAINING DATA ON NON-VOLATILE MEMORY SYSTEMS

(75) Inventors: Alan Welsh Sinclair, Falkirk (GB); Peter John Smith, Eskbank (GB)

(73) Assignee: SanDisk Corproation, Milpitas, CA (US)

( * ) Notice: Subject to any disclaimer, the term of this patent is extended or adjusted under 35 U.S.C. 154(b) by 381 days.

(21) Appl. No.: 10/897,049

(22) Filed: Jul. 21, 2004

(65) Prior Publication Data

US 2006/0020744 A1 Jan. 26, 2006

(51) Int. Cl.
G06F 12/00 (2006.01)
G06F 13/00 (2006.01)
G06F 13/28 (2006.01)

(52) U.S. Cl. .................... 711/156; 711/103; 707/206

(58) Field of Classification Search ............... 711/156
See application file for complete search history.

(56) References Cited

U.S. PATENT DOCUMENTS

| | | | |
|---|---|---|---|
| 5,043,940 A | 8/1991 | Harari | |
| 5,172,338 A | 12/1992 | Mehrotra et al. | |
| 5,734,816 A * | 3/1998 | Niijima et al. | 714/8 |
| 5,798,968 A | 8/1998 | Lee et al. | |
| 5,890,192 A | 3/1999 | Lee et al. | |
| 5,930,167 A | 7/1999 | Lee et al. | |
| 6,014,724 A | 1/2000 | Jenett | |
| 6,456,528 B1 | 9/2002 | Chen | |
| 6,581,132 B1 * | 6/2003 | Kakinuma et al. | 711/103 |
| 6,725,321 B1 * | 4/2004 | Sinclair et al. | 711/103 |
| 2003/0109093 A1 | 6/2003 | Harari et al. | |
| 2003/0210587 A1 * | 11/2003 | Yamagami et al. | 365/200 |
| 2005/0044331 A1 * | 2/2005 | Simms | 711/159 |
| 2005/0132127 A1 * | 6/2005 | Chung et al. | 711/103 |

FOREIGN PATENT DOCUMENTS

WO WO02/058074 7/2002

* cited by examiner

Primary Examiner—Tuan V. Thai
Assistant Examiner—Edward J Dudek
(74) Attorney, Agent, or Firm—Beyer Law Group LLP

(57) ABSTRACT

Techniques for managing data in a non-volatile memory system (e.g., Flash Memory) are disclosed. A controller can use information relating to a host's filing system, which is stored by the host on non-volatile memory, to determine if one or more clusters (or sectors with clusters) are currently allocated. The controller can use the information relating to the host's filing system to ensure that one or more clusters (or one or more sectors within a cluster) are not copied from one location to another location in the memory during a garbage collection cycle. As a result, some unnecessary operations (e.g., copying data) which are conventionally performed can be avoided and system performance can be enhanced.

17 Claims, 8 Drawing Sheets

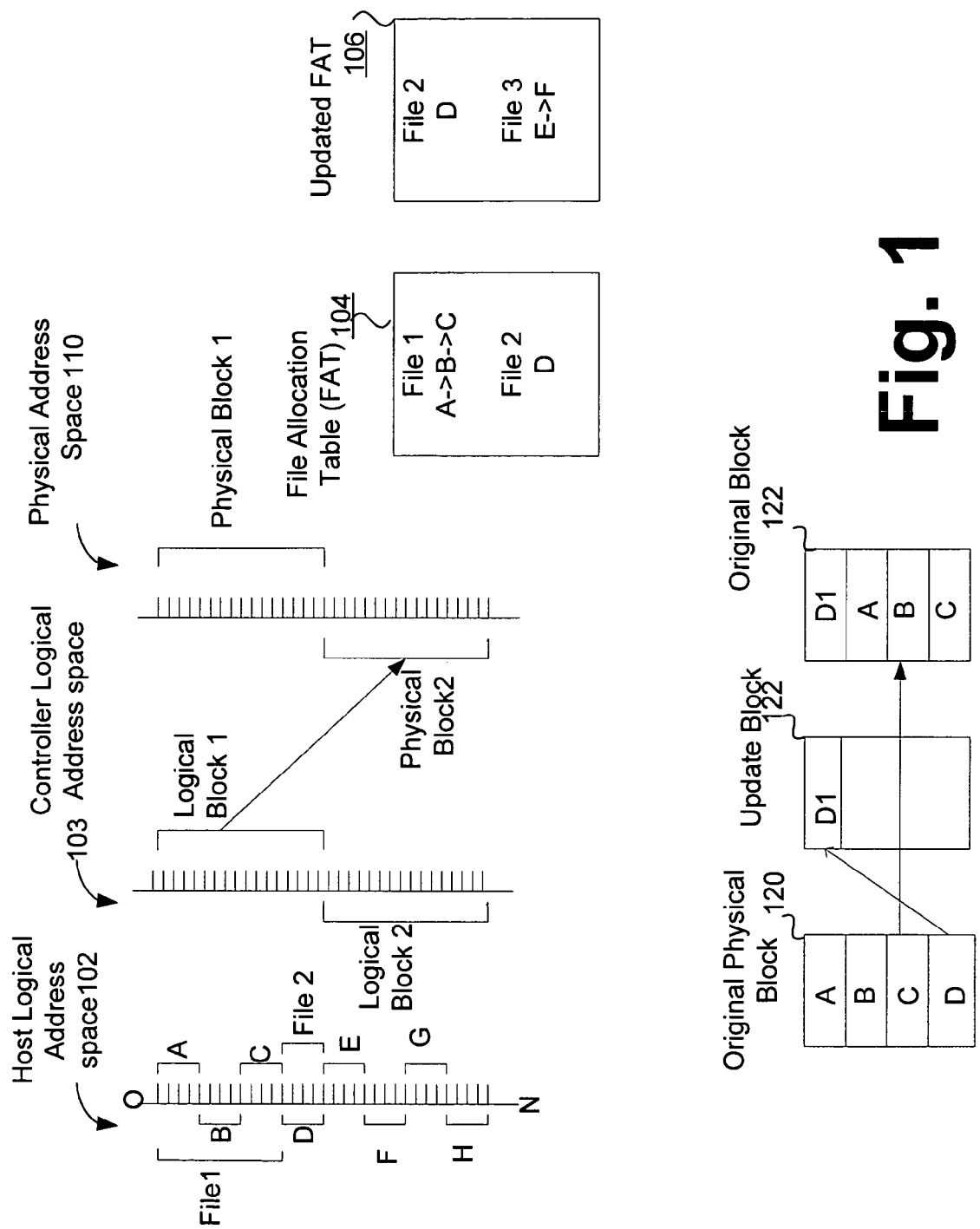

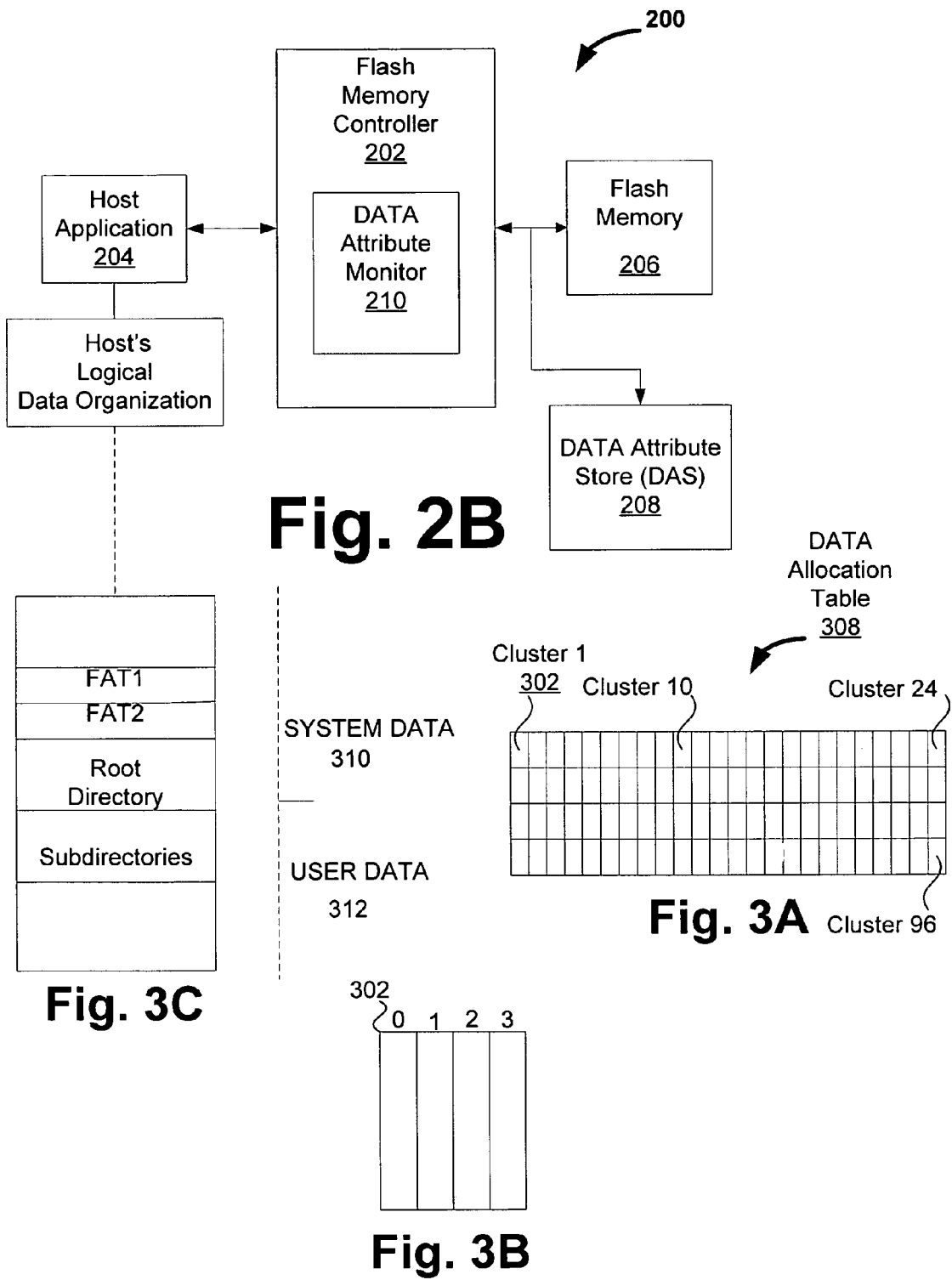

METHOD AND APPARATUS FOR MAINTAINING DATA ON NON-VOLATILE MEMORY SYSTEMS

BACKGROUND OF THE INVENTION

The present invention relates generally to data storage systems for use with computing systems and, more particularly, to techniques for maintaining data on non-volatile memory storage device.

There are many commercially successful non-volatile memory products being used today, particularly in the form of small form factor cards, which employ an array of flash EEPROM (Electrically Erasable and Programmable Read Only Memory) cells formed on one or more integrated circuit chips. Typically, a memory controller on a separate integrated circuit chip is provided as an interface to a host. The host can use the controller to perform various operations (e.g., read, write) on the non-volatile memory. A controller typically includes a microprocessor, some non-volatile read-only-memory (ROM), a volatile random-access-memory (RAM) and one or more special circuits such as one that calculates an error-correction-code (ECC) from data as they pass through the controller during the programming and reading of data. Some of the commercially available cards are Compact-Flash™ (CF) cards, MultiMedia cards (MMC), Secure Digital (SD) cards, Smart Media cards, personnel tags (P-Tag) and Memory Stock cards. Hosts include personal computers, notebook computers, personal digital assistants (PDAs), various data communication devices, digital cameras, cellular telephones, portable audio players, automobile sound systems, and similar types of equipment. Besides a memory card implementation, non-volatile memory can alternatively be embedded into various types of host systems.

As in most integrated circuit applications, the pressure to shrink the silicon substrate area required to implement some integrated circuit function also exists with flash EEPROM memory cell arrays. It is continually desired to increase the amount of digital data that can be stored in a given area of a silicon substrate, in order to increase the storage capacity of a given size memory card and other types of packages, or to both increase capacity and decrease size. One way to increase the storage density of data is to store more than one bit of data per memory cell and/or per storage unit or element. This is accomplished by dividing a window of a storage element charge level voltage range into more than two states. The use of four such states allows each cell to store two bits of data, either states store three bits of data per storage element, and so on. Multiple state flash EEPROM structures using floating gates and their operation are described in U.S. Pat. Nos. 5,043,940 and 5,172,338, and for structures using dielectric floating gates in the aforementioned U.S. Patent Application Publication No. 2003/0109093. Selected portions of a multistate memory cell array may also be operated in two states (binary) for various reasons, in a manner described in U.S. Pat. Nos. 5,930,167 and 6,456,528.

Memory cells of a typical flash EEPROM array are divided into discrete "blocks" of cells that are erased together. Each erase block typically stores one or more pages of data, the page being the minimum unit of programming and reading, although more than one page may be programmed or read in parallel in different sub-arrays or planes. Each page typically stores one or more sectors of data, the size of the sector being defined by the host system. An example sector includes 512 bytes of user data, following a standard established with magnetic disk drives, plus some number of bytes of overhead information about the user data and/or the erase block in which they are stored. Such memories are typically configured with 16, 32 or more pages within each erase block, and each page stores one or just a few host sectors of data. It should also be noted that in order to re-write data to a block, the block should be erased first.

In order to increase the degree to parallelism during programming user data into the memory array and read user data from it, the array is typically divided into sub-arrays, commonly referred to as planes, which contain their own data registers and other circuits to allow parallel operation such that sectors of data may be programmed to or read from each of several or all the planes simultaneously. An array on a single integrated circuit may be physically divided into planes, or each plane may be formed from a separate one or more integrated circuit chips. Examples of such a memory implementation are described in U.S. Pat. Nos. 5,798,968 and 5,890,192.

To further efficiently manage the memory, erase blocks may be linked together to form virtual blocks or metablocks. That is, each metablock is defined to include one erase block from each plane. Use of the metablock is described in International Patent Application Publication No. WO 02/058074. The metablock is identified by a host logical block address as a destination for programming and reading data. Similarly, all erase blocks of a metablock are erased together. The controller in a memory system operated with such large blocks and/or metablocks performs a number of functions including the translation between logical block addresses (LBAs) received from a host, and physical block numbers (PBNs) within the memory cell array. Individual pages within the blocks are typically identified by offsets within the block address. Address translation often involves use of intermediate terms of a logical block number (LBN) and logical page.

From the perspective of a host application, flash memory can be divided into a logical address space starting from a logical address zero (0) and ending with a logical address N. FIG. 1 illustrates a host's logical address space 102 which is partitioned into "logical sectors". The host groups several (e.g., four (4)) logical sectors into a cluster. As shown in FIG. 1, a host may divide the logical address space 102 into clusters that include clusters A, B, C, D, E, F, G and H. As such, each of these clusters may represent a predetermined number of sectors (e.g., four (4) logical sectors per cluster). In any case, the host allocates data in a logical unit of data which can be referred to as a "cluster". For example, clusters A, B and C may be used to allocate a file 1, while cluster D is used to allocate a file 2. It should be noted that the host allocates files in clusters. However, not all the logical sectors in a cluster need to contain data for a file. By way of example, only a portion (e.g., only one logical sector) of cluster C may have data. Nevertheless, the host typically allocates a cluster to a file even though not all the logical sectors in the cluster are needed.

A host can use a File Allocation Table (FAT) 104 to keep track of files. The File Allocation Table (FAT) 104 effectively represents a logical file structure and also indicates what cluster has been allocated for each of the files in the logical file structure. The host maintains the logical file structure by updating the File Allocation Table (FAT) 104. By way of example, when a new file is allocated, the File Allocation Table (FAT) 104 is updated to, among other things, indicate which clusters have been allocated for the new file. Also, when a file or directory is deleted, the host updates the File Allocation Table (FAT) 104. It should be noted that clusters may be deallocated by the host as a result of an update. By way of example, when the host deletes file 1, an updated File Allocation Table (FAT) 106 may result where the host effectively deallocates clusters A, B, and C which were allocated for storing file 1.

In contrast to a host's logical address space, the logical address space of a flash-memory controller is divided into "logical blocks". In other words, the same logical address space 102 may be represented as a logical address space 103 for the controller. As shown in FIG. 1, the logical address space 103 may be divided into various logical blocks, including logical block 1 and logical block 2. These logical blocks are mapped into physical blocks of memory that can be erased as a unit. For example, logical block 1 may be mapped into physical block 2, and so on. In summary, the host and controller use different logical units of memory. The host divides the logical address space into clusters while the controller divides the logical address space into logical blocks. It should also be noted that typically host clusters are applied to logical address space allocated for application data and sub-directory entries only. In addition, logical address space allocated for other system data may not be managed by the host as clusters. It should also be noted that the first cluster is not normally located at the beginning of the logical address space. Clusters and logical blocks may therefore not align with each other.

A conventional controller, however, is not aware of the logical organization used by the host. Conventionally, the controller simply maps the logical address 102 used by the host to a logical address 103 and then into a physical address 110. This means that a conventional controller does not consider the host's logical organization of data or consequences that a host operation may have had on data. By way of example, when a new file is allocated, the logical file system 104 is updated to, among other things, indicate which clusters have been allocated for the new file. Also, when a file or directory is deleted, the host updates the logical file system 104. Moreover, one or more clusters may be deallocated by a host. By way of example, when the host deletes file 1, the updated File Allocation Table 106 indicates that the host has effectively deallocated clusters A, B, and C which were previously allocated for storing file 1 (i.e., file 1 is no longer represented in updated File Allocation Table 106). Although clusters A, B, and C have been deallocated by the host and can be erased, a conventional controller does not "garbage collect" that data corresponding to deallocated clusters A, B, and C. This means that the data will persist on memory. In addition, the deallocated data may be copied a number of times when blocks are updated during garbage collection when data in two blocks may be combined into one block.

To further illustrate, an original physical block 120 is depicted in FIG. 1. For simplicity, it is assumed that the original physical block 120 includes data corresponding to logical clusters A, B, C and D used by the host to allocate files 1 and 2. Also, further assuming that the host has later deallocated file 1 (clusters A, B and C), the original physical block 120 still contains all the logical clusters A, B, C and D because the controller has no way of knowing that file 1 has been deallocated by the host. The host, however, has requested the controller to update data portion D of the original physical block 120. In other words, at some point the host may want to change file 2, so it sends a write request using the logical address it knows for data corresponding to one or more logical sectors that should be updated. The controller determines that these logical sectors addressed by the host correspond to sectors that already have been written to by the host (i.e., Cluster D), so an update block 122 is used partly because data in original physical block 120 cannot be overwritten. This means that two physical blocks may be used to represent a logical block for some time until the update block 122 is "closed" (i.e., all data in original block 120 is copied to block 122). The original block 120 and the update block 122 may be combined, for example, during a garbage collection cycle, so that the update block 122 becomes an "original" block 122 and the previous original block 120 is erased and returned to a pool of available memory blocks. In any case, it should be noted that data corresponding to the deallocated clusters (A, B, and C) are copied sooner or later to the update block 122 so that update block 122 can be closed and original block 120 can be erased. The controller may maintain a mapping table within volatile memory or non-volatile memory defining the allocation of physical memory blocks to logical blocks of data. Copying data stored in non-volatile memory takes a significant amount of time and resources. However, copying deallocated data (e.g., deallocated clusters A, B, and C) is not necessary. Thus, system performance can be further enhanced if deallocated data is not copied. In general, it is desirable to enhance system performance as much as possible while adhering to the addressing conventions that are widely used.

Accordingly, alternative non-volatile memory management techniques would be useful.

SUMMARY OF THE INVENTION

Broadly speaking, the invention pertains to techniques for managing data in a non-volatile memory system (e.g., Flash Memory). In accordance with one aspect of the invention, a controller can use information relating to a host's filing system, which is stored by the host on non-volatile memory, to determine if one or more clusters (or one or more sectors within one or more clusters) are currently allocated. As will be appreciated, the controller can use the information relating to the host's filing system, among other things, to ensure that one or more clusters (or one or more sectors) are not copied from one location to another location in the memory, for example, during a garbage collection cycle. As a result, some unnecessary operations (e.g., copying data) which are conventionally performed can be avoided and system performance is enhanced.

It will also be appreciated that the controller may directly use the information normally written by the host in a File Allocation Table (FAT) to determine whether one or more previously allocated clusters have been deallocated. Alternatively, the controller may use the information written in the root directory, subdirectories, and File Allocation Table (FAT) to generate and/or maintain its own information about cluster allocation, for example, in a Data Allocation Table (DAT). However, it should be clear that the invention may be implemented to make use of the information normally stored in the File Allocation Table (FAT). As such, it is not necessary for the controller to maintain its own information or to generate any additional data structures (e.g., Data Allocation Table). However, as will be described below, maintaining a Data Allocation Table (DAT) may offer more advantages than solely relying on the information obtained from File Allocation Table (FAT). Therefore, a Data Attribute Store (DAS) which may, for example, be implemented as a Data Allocation Table (DAT) will also be further illustrated.

In general, a Data Attribute Store (DAS) which includes one or more attributes of data can be maintained by the controller in the non-volatile memory. A data attribute can provide useful information about data (e.g., allocation or deallocation status, size, priority). As such, the Data Attribute Store (DAS) can be used to manage data more intelligently. Another aspect of the invention pertains to techniques for managing data using the Data Attribute Store (DAS).

In one embodiment, the Data Attribute Store (DAS) is implemented as an Allocation Store (AS). The Allocation Store (AS) can, for example, be implemented as a table, or a Data Allocation Table (DAT) that provides an allocation status for each cluster (host's logical unit) of data. A cluster represents a logical unit that the host uses in order to logically organize data. To achieve better memory management, a controller of the non-volatile memory system can access the Data Allocation Table (DAT). As such, the Data Allocation Table (DAT) effectively provides a bridge between the logical organization used by the host and the controller. This allows the controller to effectively understand the logical organization of the host. In addition, the controller monitors host activities to determine, for example, whether the host has deallocated a cluster. By way of example, root directory, File Allocation Table (FAT), and subdirectories of a DOS compliant system may be monitored to detect deallocation of a cluster of data by the host. A change in the root directory, File Allocation Table (FAT) or a subdirectory may be caused, for example, as a result of a file or a portion of the file being deleted by the host. In any case, when deallocation of one or more clusters of data have been detected, the controller updates the Data Allocation Table (DAT). Thus, the Data Allocation Table (DAT) can provide updated information about data. This information can be used to manage data more intelligently. By way of example, a deallocation status can be used to determine whether data should be copied during garbage collection. Data that has been deallocated need not be copied. As a result, some unnecessary operations which are conventionally performed can be avoided and system performance can be enhanced.

The invention can be implemented in numerous ways, including as a method, system, device, apparatus, or computer readable medium. Other aspects and advantages of the invention will become apparent from the following detailed description, taken in conjunction with the accompanying drawings, illustrating by way of example the principles of the invention.

BRIEF DESCRIPTION OF THE DRAWINGS

The invention is illustrated by way of example, and not by way of limitation, in the figures of the accompanying drawings and in which like reference numerals refer to similar elements and in which:

FIG. 1 illustrates a logical address space which can be partitioned into several logical sectors.

FIG. 2B depicts a computing environment in accordance with one embodiment of the invention.

FIG. 3A depict a data allocation table (DAT) in accordance with one embodiment of the invention.

FIG. 3B depicts an entry of a data allocation table (DAT) table in accordance with one embodiment of the invention.

FIG. 3C depicts a host's logical data organization which may be used by a controller in accordance with one embodiment of the invention

DETAILED DESCRIPTION OF THE INVENTION

Figure 2A:
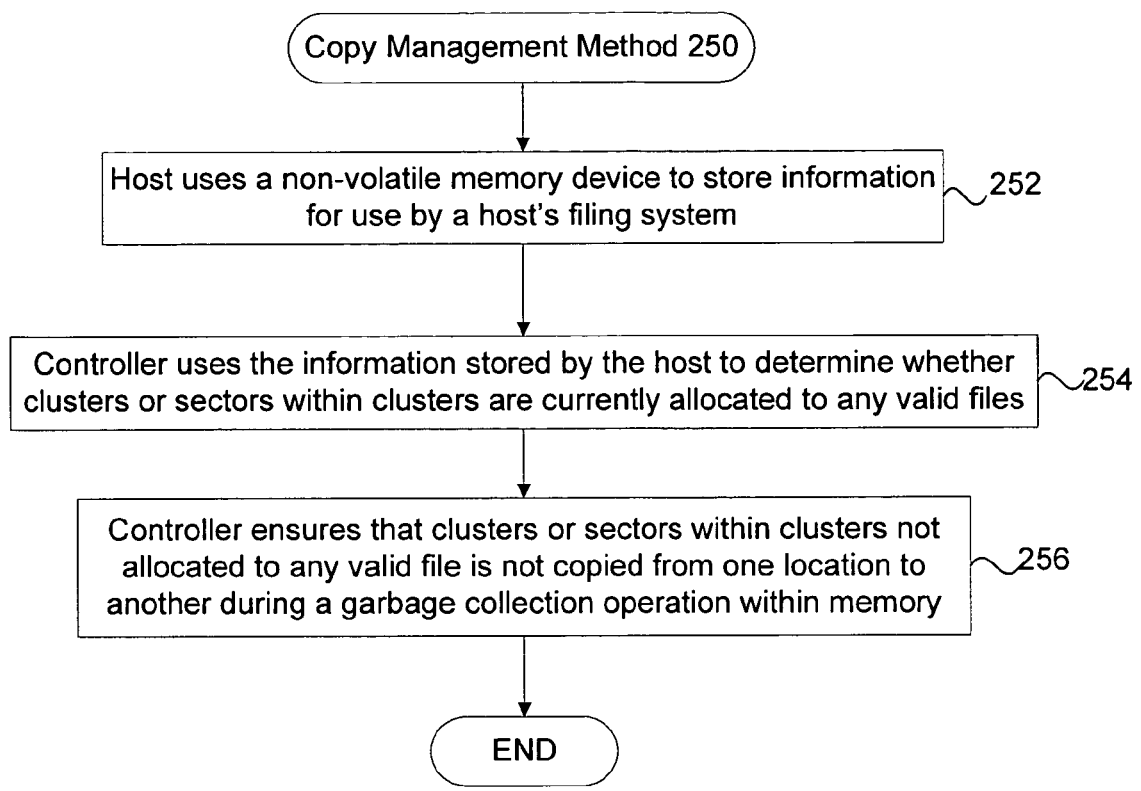
FIG. 2A depicts a copy management method in accordance with one embodiment of the invention.

The invention pertains to techniques for managing data in a non-volatile memory system (e.g., Flash Memory). In accordance with one aspect of the invention, a controller can use information relating to a host's filing system, which is stored by the host on non-volatile memory, to determine if one or more clusters (one or more sectors within one or more clusters) are currently allocated. As will be appreciated, the controller can use the information relating to the host's filing system, among other things, to ensure that one or more clusters (or one or more sectors within the cluster) are not copied from one location to another location in the memory, for example, during a garbage collection cycle. As a result, some unnecessary operations (e.g., copying data) which are conventionally performed can be avoided and system performance can be enhanced.

It will also be appreciated that the controller may directly use the information normally written by the host in a File Allocation Table (FAT) to determine whether one or more previously allocated clusters have been deallocated. Alternatively, the controller may use the information written in a root directory, subdirectories, and File Allocation Table (FAT) to generate and/or maintain its own information about cluster allocation, for example, in a Data Allocation Table (DAT). However, it should be clear that the invention may be implemented to make use of the information normally stored in the File Allocation Table (FAT). As such, it is not necessary for the controller to maintain its own information or to generate any additional data structures (e.g., Data Allocation Table (DAT)). However, as will be described below, maintaining a Data Allocation Table (DAT) may offer more advantages than solely relying on the information obtained from File Allocation Table (FAT). Therefore, a Data Attribute Store (DAS) which may, for example, be implemented as a Data Allocation Table (DAT) will also be further illustrated.

In general, a Data Attribute Store (DAS) which includes one or more attributes of data can be maintained by the controller in the non-volatile memory. A data attribute can provide useful information about data (e.g., allocation or deallocation status, size, priority). As such, the Data Attribute Store (DAS) can be used to manage data more intelligently. Another aspect of the invention pertains to techniques for managing data using the Data Attribute Store (DAS).

In one embodiment, the Data Attribute Store (DAS) is implemented as an Allocation Store (AS). The Allocation Store (AS) can, for example, be implemented as a table, or a Data Allocation Table (DAT) that provides an allocation status for each cluster (host's logical unit) of data. A cluster represents a logical unit that the host uses in order to logically organize data. To achieve better memory management, a controller of the non-volatile memory system can access the Data Allocation Table (DAT). As such, the Data Allocation Table (DAT) effectively provides a bridge between the logical organization used by the host and the controller. This allows the controller to effectively understand the logical organization of the host. In addition, the controller monitors host activities to determine, for example, whether the host has deallocated a cluster. By way of example, root directory, File Allocation Table (FAT) and subdirectories of a DOS compliant system may be monitored to detect deallocation of a cluster of data by the host. A change in the root directory, File Allocation Table (FAT) or a subdirectory may be caused, for example, as a result of a file or a portion of the file being deleted by the host. In any case, when deallocation of one or more clusters of data have been detected, the controller updates the Data Allocation Table (DAT). Thus, the Data Allocation Table (DAT) can provide updated information about data. This information can be used to manage data more intelligently. By way of example, a deallocation status can be used to determine whether data should be copied during garbage collection. Data that has been deallocated need not be copied. As a result, some unnecessary operations which are conventionally performed can be avoided and system performance can be enhanced.

Embodiments of the invention are discussed below with reference to FIGS. 2A-8. However, those skilled in the art will readily appreciate that the detailed description given herein with respect to these figures is for explanatory purposes as the invention extends beyond these limited embodiments. For example, although the description refers to flash-memory, other types of non-volatile memory can be used. Other types of non-volatile memory include Magnetoresistive RAM (MRAM), Ferroelectric RAM, and phase change memory (also known as Ovonics Unified Memory or OUM).

As noted above, a controller can use information relating to a host's filing system, which is stored by the host on non-volatile memory, to determine if one or more clusters (or sectors within clusters) are currently allocated in accordance with one aspect of the invention. The controller can use the information relating to the host's file system, among other things, to ensure that one or more clusters (or a sector within a cluster) are not copied from one location to another location in the memory during a garbage collection cycle. To further illustrate, FIG. 2A depicts a copy management 250 in accordance with one aspect of the invention. Initially, the host uses a non-volatile memory device to store (252) information for use by a filing system. Next, the controller uses the information stored (252) by the host to determine (254) if one or more clusters (or one or more sectors within one or more clusters) are currently allocated to any valid files. As will be appreciated by those skilled in the art, the controller may directly use the information normally written by the host in a File Allocation Table (FAT) in order to determine (254) if one or more clusters (or one or more sectors within one or more clusters) are currently allocated to any valid files. Alternatively, the controller may use the information written in a root directory, subdirectories, and FAT together with the sequence of logical sectors written by host to the device, in order to generate and maintain its own information about cluster allocation. For example, the controller may generate and/or maintain its own Data Allocation Table (DAT). In any case, the controller ensures (256) that any cluster (or sectors within a cluster) which are determined (254) to be currently NOT allocated are not copied from one location to another during a garbage collection operation within memory. In other words, a cluster or (a sector within a cluster) is only copied if it is determined (254) that the cluster (or a sector within a cluster) is currently allocated. The copy management method 250 ends following operation 256.

As noted above, maintaining a Data Allocation Table (DAT) may offer more advantages than solely relying on the information obtained from File Allocation Table (FAT). As will become apparent to those skilled in the art, the FAT may not always indicate that a cluster has been deallocation. For example, chains of cluster entries may exist in the FAT without being linked to any file reference in a directory. When a file is deleted, its directory entry is modified by the file system in the host (first character of filename changed to 0xE5) to signify that the file has been deleted. However, the cluster entries in the FAT may retain their chaining information as if they were still allocated to a file. Algorithms for reusing clusters, and for updating a FAT cluster entry to "0x0000" to signify unused, are typically a function of the specific file system implementation in the host. The DAT can use changes in directory or subdirectory information to allow cluster attribute to reflect the current allocation status of that cluster to a file, without relying on the host file system. For some environments, implementation of DAT may even be safer than solely relying on FAT. When FAT is solely used to ascertain allocation status of clusters, a memory system may not know about allocation of a cluster to a file until the host updates the FAT at the end of the file. Therefore, if a host modifies part of a file already written, before writing the FAT, the controller may discard some valid data that still has a deallocated status. Implementation of a DAT can effectively address this issue.

In addition, a Data Allocation Table (DAT) provided in accordance with the principles of the invention may also provide features that are not typically provided by FAT. For example, the FAT defines a single allocation status for a cluster. A DAT, however, can be implemented to, for example, allow a multi-bit status to be recorded, allowing allocation status to be resolved to a sector, or group of sectors, within a cluster. This allows the controller to avoid copying unallocated sectors between files, where the last cluster of the first file is only partially used. Given the advantages and additional features that a DAT may provide, the embodiments described below further illustrate a controller that maintains its own information in a Data Attribute Store (DAS) (e.g., a DAT). However, it should be evident that a controller may solely rely on the FAT to determine allocation status associated with various files used by the host without departing from the scope and spirit of the invention.

FIG. 2B depicts a computing environment 200 in accordance with one embodiment of the invention. In the computing environment 200, flash-memory controller 202 allows a host application 204 to access a non-volatile memory (e.g., flash memory 206). In other words, the host application 204 uses the flash memory controller 202 as an interface to the flash memory 206. Hence, the host application 204 can request that the flash-memory controller 202 perform various access operations (e.g., read, write) on the flash memory 206. The host application 204 can use a logical address space to address data. The flash-memory controller maps the host's logical address space into a controller logical address space, which is in turn, mapped to a physical address space on the flash-memory 206.

Moreover, the flash-memory can build and maintain a Data Attribute Store (DAS) 208. The DAS 208 includes information about various attributes associated with data stored in flash-memory 206. By way of example, the attributes of data stored in Data Attribute Store (DAS) 208 can include allocation status of data, size of allocated data, priority. In general, the Data Attribute Store (DAS) 208 can store any desirable data attribute and represents the attribute with one or more bits of information. It should be noted that the flash-memory controller 202 provides a data attribute monitor 210 to monitor the activity of the host application 204. The data attribute monitor 210 can interpret the activities of the host application 204 with respect to data stored on flash-memory 206. This means that the data attribute monitor 210 can determine where a data attribute should be changed and update the data attribute in the DAS 208 accordingly.

To further illustrate, FIG. 3A depicts Data Attribute Store (DAS) 208 in accordance with one embodiment of the invention. In this embodiment, the Data Attribute Store (DAS) 208 is implemented as a Data Allocation Table (DAT) 308. As such, DAT 308 provides information about allocation/deallocation status of various data portions of a non-volatile memory system. As will be appreciated, these various data portions can be organized in accordance with a logical data organization, namely, the logical data organization used by the host application 204. As noted above, a host application may organize data into host logical units which can be referred to as clusters. The DAT 308 can be partitioned into units that represent these clusters. This means that each of the logical clusters used by a host application can be represented as an entry in the DAT 308. For example, cluster 1 can be represented by the first ($1^{st}$) entry, cluster 10 by the tenth ($10^{th}$) entry, and so on. Moreover, each entry of the DAT 308 can indicate the Allocation/Deallocation status of a cluster. For example, one bit can be used for each entry of the DAT 308 to indicate whether a logical cluster is currently allocated or deallocated. It should be noted that several bits can be used to provide more information about an attribute and/or information about several attributes. In any case, the DAT 308 allows for better management of data. By way of example, based on allocation/deallocation status of a data portion, the flash-memory controller may avoid copying data which has been deallocated by a host application.

To further illustrate, FIG. 3B depicts an entry 302 of the DAT 308 in accordance with one embodiment of the invention. The table entry 302 includes 4 bits wherein the first bit (bit 0) can provide an allocation/deallocation status, and three (3) other bits (bits 1-3) collectively can indicate how much data has been allocated (e.g., "100" to indicate half full, and "111" to indicate full, etc.). Similarly, more bits may be used to provide information about another attribute of the cluster. By way of example, each cluster can be represented by four (4) bits, wherein one (1) bit represents a deallocation status and three (3) bits indicate what portion of the cluster has been deallocated. As will be apparent to those skilled in the art, multiple bits for a cluster may be defined in numerous other ways. For example, the polarity (or order) can be revered or more bits can be used (e.g., 6, 8, 12). Alternatively, all bits can be allocated to indicate the number of "sub-clusters" of sectors that are fully deallocated and a fully allocated cluster may, for example, be marked with all bits set to zero (0).

As noted above, a data attribute monitor 210 monitors the activity of a host application 204 (FIG. 2B). Based on this monitoring, the data attribute monitor 210 can update a Data Attribute Store (DAS) 208. As shown in FIG. 2, in order to interpret the activities of the host application 204, the data attribute monitor 210 needs to realize the logical organization of data which the host understands and uses. To further illustrate, FIG. 3C depicts a host's logical data organization which may be used by a controller in accordance with one embodiment of the invention. As shown in FIG. 3C, a host may divide the logical address space into a system 310 and a user space 312. The system data 310 may include: a File Allocation Table 1 (FAT1), FAT2 (a copy of FAT1), and Root Directory information, which all may be stored as system data 310. The user space may include information about subdirectories. The data attribute monitor 210 may monitor FAT1, FAT2, Root Directory, and the subdirectories to determine whether the host application 202 has deallocated any data (e.g., removed a file, made a file shorter, etc.). The monitoring of data will also be described below with reference to FIG. 6.

Figure 4:
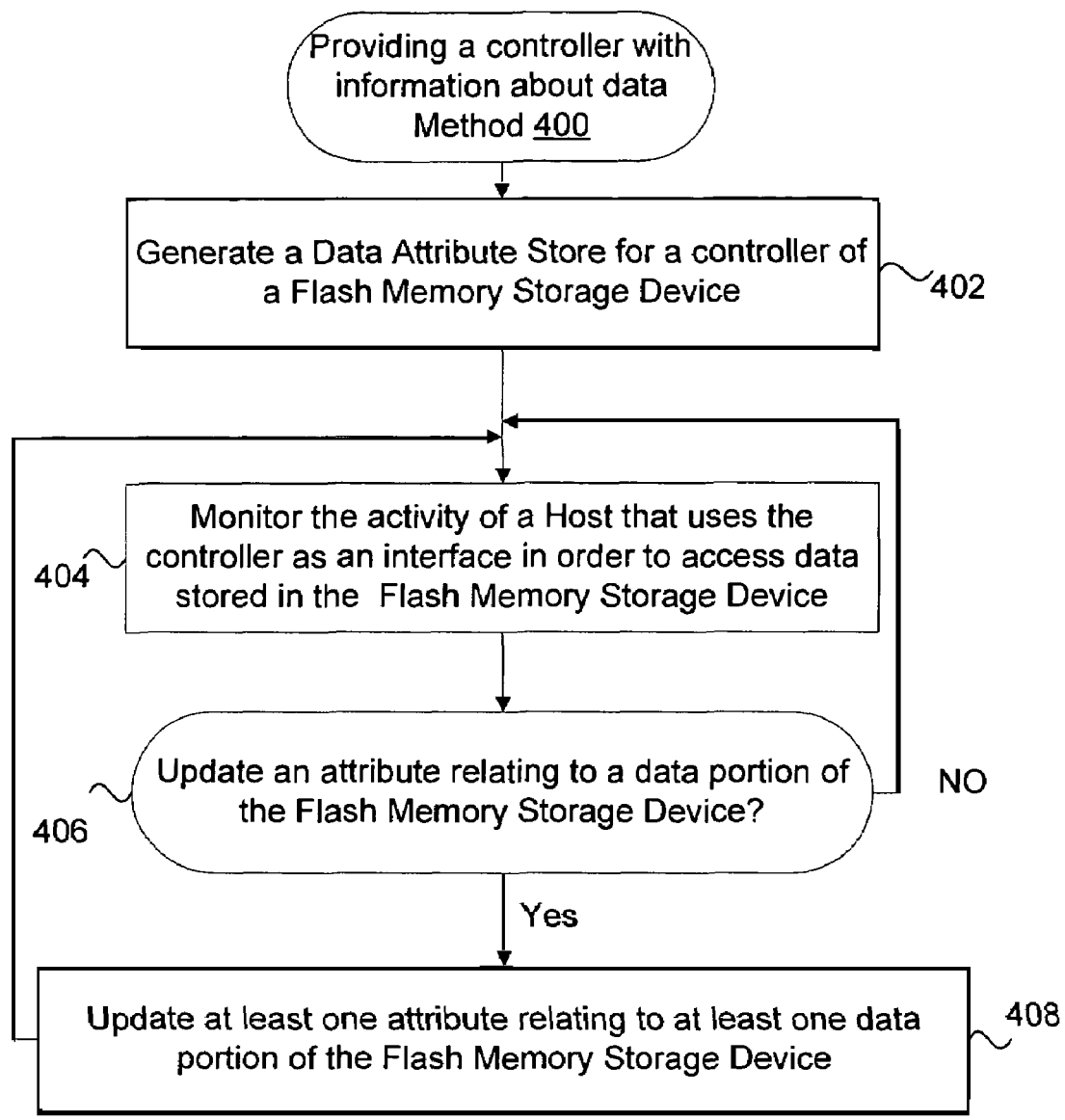
FIG. 4 depicts a method for providing a flash-memory controller with information about data that is stored on flash-memory in accordance with one embodiment of the invention.

However, referring now to FIG. 4, a method 400 for providing a flash-memory controller with information about data stored on flash-memory is depicted in accordance with one embodiment of the invention. The information about data can be used by the flash-memory controller, for example, to make informed decisions about data during data maintenance (e.g., garbage collection). The method 400 can, for example, be used by the flash-memory controller 202 of FIG. 2.

Initially, a Data Attribute Store (DAS) is generated (402) for a controller of a flash-memory storage device. The Data Attribute Store (DAS) provides one or more attributes for each of a plurality of data portions in a flash-memory storage device. The activity of a host that uses the controller to access data is monitored (404). Next, based on the monitoring (404), it is determined (406) whether an attribute relating to a data portion of the flash memory storage device should be updated. Accordingly, at least one attribute relating to at least one data portion is updated (408) if it is determined (406) that an update should be performed for at least one data portion of the flash-memory storage device. After the update (408), the activity of the host is monitored 404. Thereafter, the method 400 can proceed in a similar manner as described above until monitoring of data is no longer desired or needed.

Figure 5:
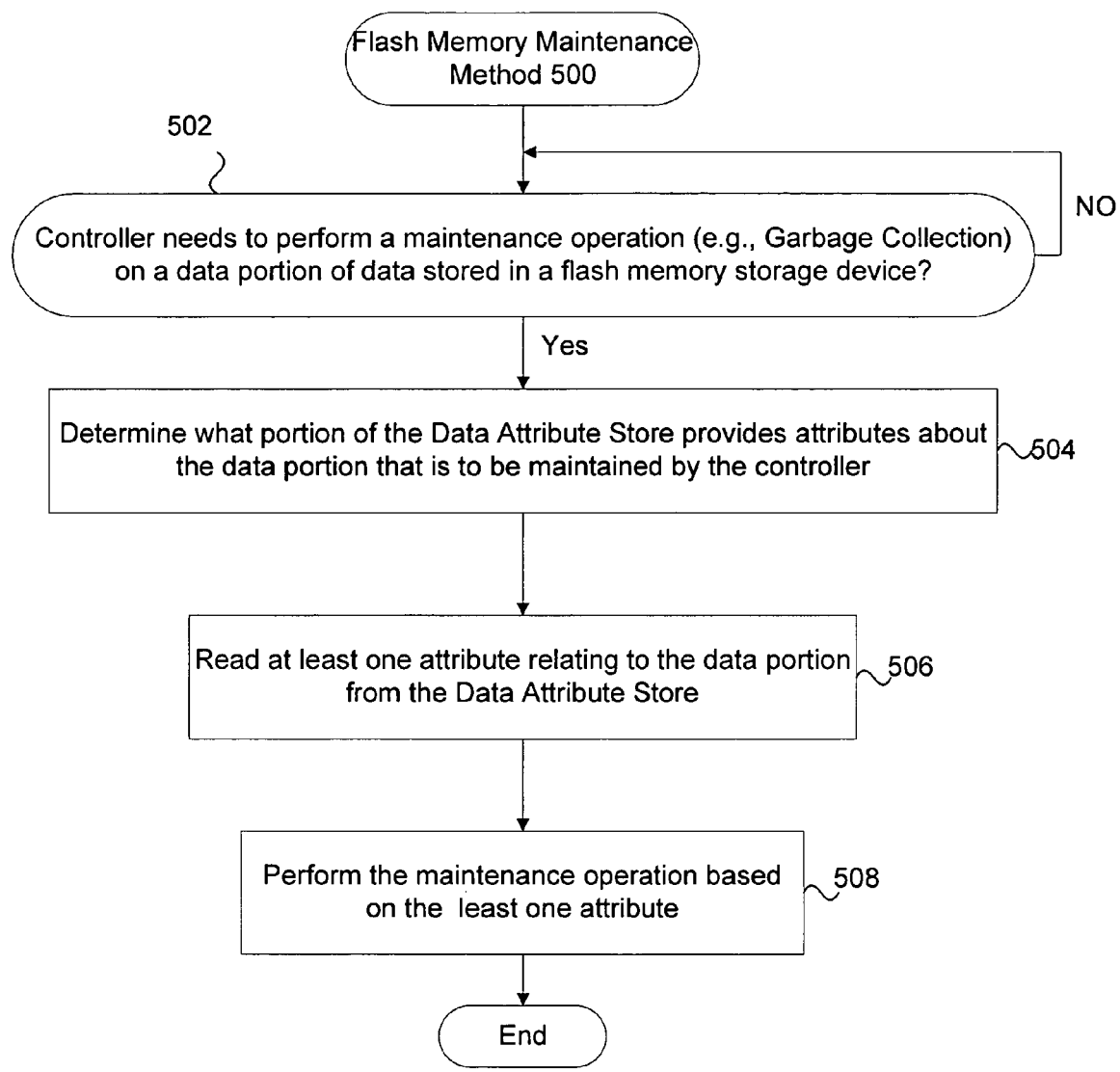
FIG. 5 illustrates a flash-memory maintenance method in accordance with one embodiment of the invention.

As noted above, a Data Attribute Store (DAS) can be provided and used by the flash-memory controller to perform maintenance operations (e.g., garbage collection). FIG. 5 depicts a flash-memory maintenance method 500 in accordance with one embodiment of the invention. Initially, it is determined 502 whether a flash-memory controller needs to perform a maintenance operation on a portion of data stored on the flash-memory storage device. If it is determined 502 that the controller needs to perform a maintenance operation, it is determined 504 what portion of a Data Attribute Store (DAS) provides information about the portion of data that is to be maintained. Accordingly, at least one attribute relating to the data portion is read 506 from the Data Attribute Store (DAS). Finally, the operation is performed 508 based on the at least one data attribute. It should be appreciated that the maintenance operation can be performed more intelligently based on the information that is provided by the at least one data attribute.

Figure 6:
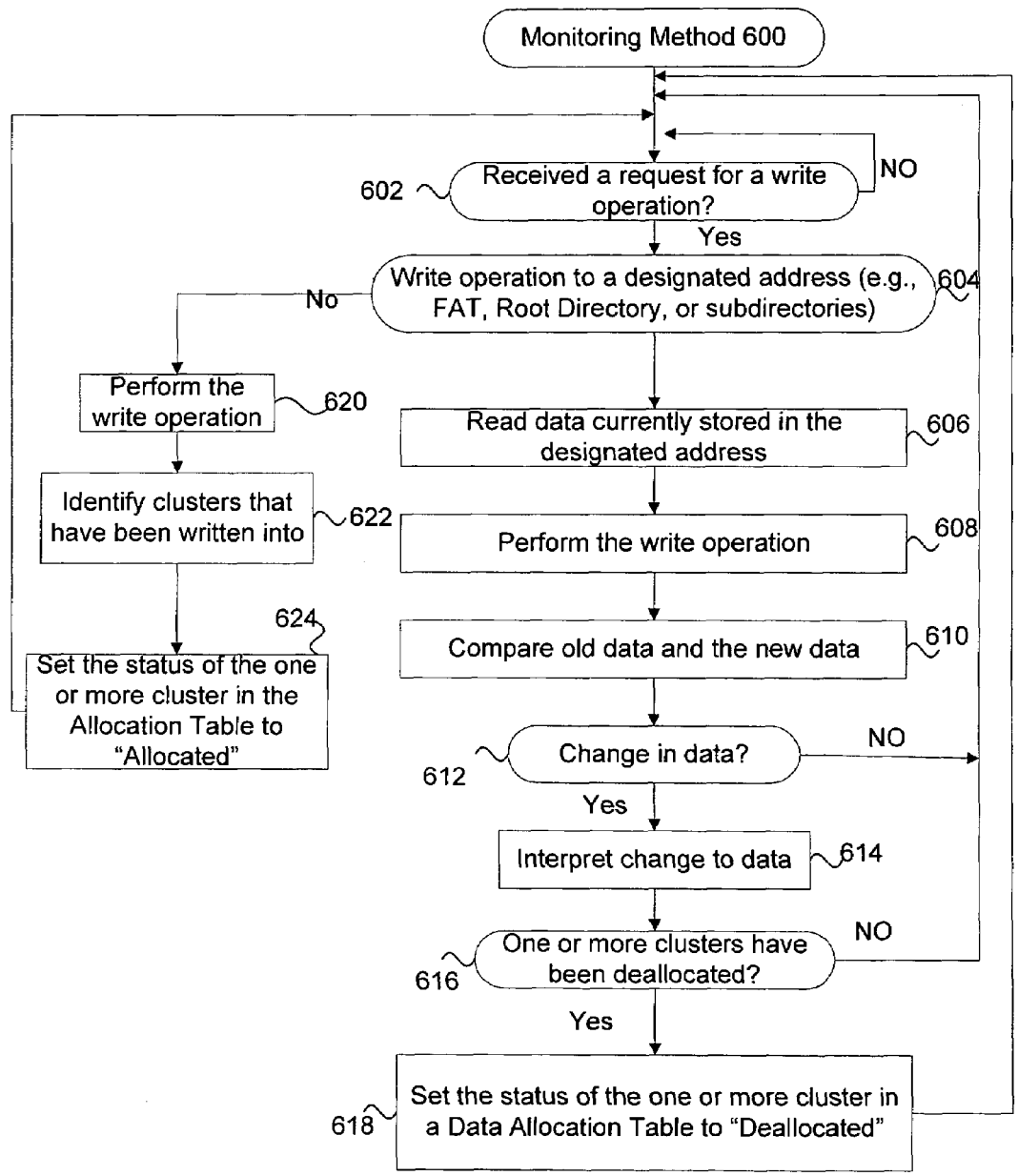
FIG. 6 illustrates a monitoring method in accordance with one embodiment of the invention.

FIG. 6 depicts a monitoring method 600 in accordance with one embodiment of the invention. The monitoring method 600 illustrates some exemplary operations that can be performed during monitoring and updating operations illustrated in FIG. 4 (i.e., operations 404, 406 and 408 of FIG. 4). The monitoring method 600 can, for example, be performed by a flash-memory controller. Initially, it is determined (602) that a request for a write operation is received. Next, it is determined whether the write operation addresses a designated address space. By way of example, the designated address space can include FAT1, FAT2, a root directory and subdirectories of a logical address space addressed by a host operating in a DOS environment. Designated address space for subdirectories may be determined from information in the root directory and in other subdirectories. In general, a designated address space represents an address space where the host activities may indicate that data has been deallocated operation (e.g., removing or modifying directories of files, editing files, etc.). In any case, if it is determined at operation 604 that the write operation is to a designated address space, the data currently stored in the designated address space is read (606). Next, the write operation is performed (608). After the write operation is performed (608), the old data which is previously read (606) is compared (610) to data written (608). Accordingly, it is determined (612) whether there is a change in data. If it is determined (612) that there is no change in data, it is determined (602) whether a request for a write operation is received.

Alternatively, in a flash memory system in which updated data is written in a different location from the old data, comparison (610) may be made directly between data at the old and new locations, without performing previous read (606).

However, if it is determined (612) that a change to data has been detected, the change is interpreted (614) to determine (616) whether one or more clusters have been deallocated. If it is determined that no cluster has been deallocated, it is determined (602) whether a request for a write operation is received. However, it should be noted that if it is determined (616) that one or more clusters have been deallocated, the status of the one or more clusters in a Data Allocation Table (DAT) is changed to indicate a "deallocated" status. Accordingly, the monitoring method 600 effectively updates (618) a Data Allocation Table (DAT) when a change in data in a designated address space is perceived (616) to have resulted in deallocation of data.

On the other hand, if it is determined (604) that the write operation is not to a designated address space, the write operation is performed (620). In addition, the clusters that have been written in are identified (622), so that the status of one or more identified clusters can be set to "allocated". As will be appreciated, this operation ensures that entries of a DAT that represent the identified clusters are set to "allocated" when a write operation is performed in the non-designated address space. After setting (624) of the status of the clusters represented in DAT to "allocated", it can be determined (602) whether a request for a write operation has been received.

Figure 7:
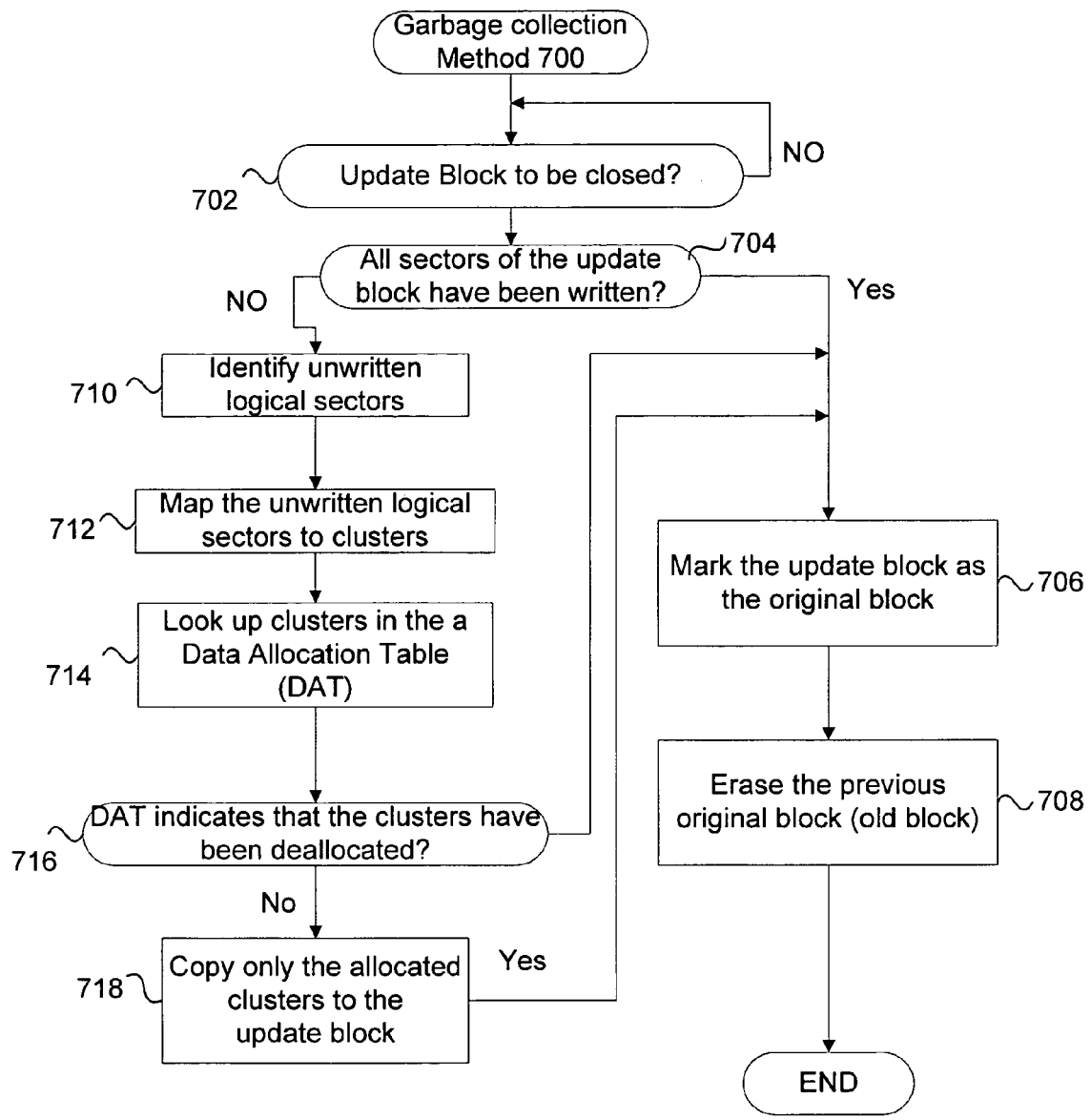
FIG. 7 depicts an exemplary garbage collection method in accordance with one embodiment of the invention.

As noted above, a Data Attribute Store (DAS) can, for example, be used to perform maintenance operations. To further illustrate, FIG. 7 depicts an exemplary garbage collection method 700 in accordance with one embodiment of the invention. As will be appreciated, the garbage collection method 700 utilizes a Data Allocation Table (DAT), to enable better updating of blocks during update operations. Initially, when it is determined (702) initially that an update block is to be closed, it is determined whether all sectors of the update block have been written to. If all logical sectors of the update block have been written into, the update block can effectively replace the original block. Accordingly, the update block is marked (706) as the original block, and the previous original block is erased (708) so that it can be used later.

On the other hand, if it is determined (702) that all sectors of the update block have not been written into, the logical sectors that correspond to the unwritten sectors are identified (710). The identified (710) logical sectors are then mapped (712) to clusters. The clusters are looked up (714) in the Data Allocation Table (DAT). Accordingly, it is determined 716 whether the DAT indicates that all of the identified (710) clusters have deallocated. If DAT indicates that all clusters are deallocated, the update block is marked (706) as the original and the old block is erased (708).

It should be noted that one or more clusters are not copied when DAT indicates (716) that all clusters have been deallocated. Data that remains allocated is copied (718) to the update block only when DAT table indicates that one or more clusters are still allocated. In any case, it should be noted that an update block may be closed immediately or at a later time when it is full. The update block can be marked 706 and the previous original block (old block) is erased 708, but unnecessary copying of unallocated data is avoided. The garbage collection method 700 ends following erasure (708).

Figure 8:
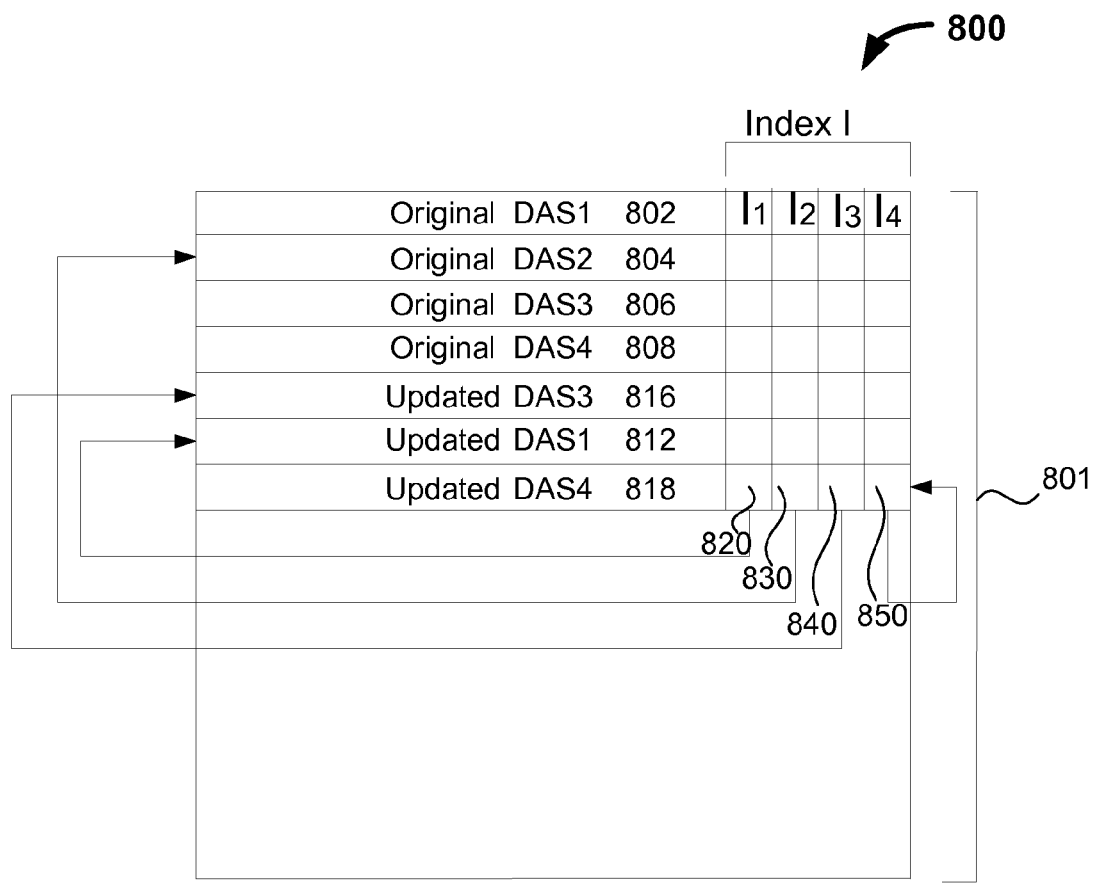
FIG. 8 depicts a Data Allocation Table (DAT) in accordance with one embodiment of the invention.

As will be appreciated, flash-memory can be used to implement a Data Attribute Store (DAS) in accordance with one embodiment of the invention. To further illustrate, FIG. 8 depicts a Data Allocation Store (DAS) 800 in accordance with one embodiment of the invention. A memory portion 801 is used to implement the Data Allocation (DAS) 800. Memory portion 801 may be a block that is erasable as a unit. The memory portion 801 is larger than memory needed to represent the Data Allocation Store (DAS) 800. Each section may be located in one or more pages, where a page is the minimum unit of programming of the memory.

As shown in FIG. 8, the Data Attribute Store (DAS) 800 can be portioned into a plurality of sections, namely, original sections DAS1 (802), DAS2 (804), DAS3 (806) and DAS4 (808) which are originally written at the beginning of the memory portion 801. Each of these original sections can represent a plurality of clusters which are used by a host to logically organize data. When a data attribute associated with a cluster needs to be updated, the corresponding section of the Data Attribute Store (DAS) 800 can be updated by writing an update section for the appropriate original section of the Data Attribute Store (DAS) 800. This update section is written after the last original section, namely DAS4 (808). By way of example, original DAS3 (806) is updated by writing a new section 816. Similarly, when there is a need to update original DAS1 (802), a new section 812 can be written. A new section 818 is written to represent original DAS4 (818), and so on.

In addition, an indexing scheme can be used to maintain the Data Allocation Store (DAS) 800. As shown in FIG. 8, each section of memory includes an index portion ($I_1$-$I_4$). This index portion of the last entry (806) references the current sections of the Data Attribute Store (DAS) 800. This means that indexes 820, 830, 840 and 850 respectively point to the first, second, third and fourth current sections (DAS1, DAS2, DAS3, DAS4) of the Data Attribute Store (DAS) 800. The memory portion 801 can be garbage collected, for example, when the memory 801 is essentially full so that the current sections (DAS1, DAS2, DAS3, DAS4) are reproduced as original sections.

It should also be noted that the invention can be implemented so that the use of the Data Attribute Store (DAS) is discretionary. The use of Data Attribute Store (DAS) can, for example, be dependent on system compliance which is determined by a verification process to ensure that the host's actual logical organization of data adheres to an expected data organization for a particular operating environment (e.g., DOS). Alternatively, use of Data Attribute Store (DAS) may be enabled by the transmission of a command by the host to signify that it complies with data organization for a particular operating environment. It should be noted that it is not necessary for the Data Allocation Table (DAT) to change the status of a cluster (or sectors within a clusters) as soon as an allocated cluster is deallocated. In other words, believing that a cluster is still allocated when it has been deallocated does not pose a serious problem. As such, it is possible to wait to set an allocation status to deallocated. As will be appreciated, setting the allocation status to deallocated for a group of clusters at one time, rather than one by one at different times, may further enhance system performance. On the other hand, those skilled in the art will appreciate that the status information for a valid, allocated cluster should always be strictly accurate and current (i.e., an allocated cluster should always be marked as allocated). To ensure that allocated clusters are correctly marked, allocation status of a cluster can automatically be set to allocated every time a host writes data to the cluster. Also, it will be appreciated that information in the Data Allocation Table (DAT) may be updated at the same time as the information in a mapping table, defining allocation of physical memory blocks to logical blocks of data, to record sectors or clusters recently written.

In addition, it will be appreciated that the Data Attribute Store (DAS) can be used for many other maintenance operations. By way of example, when the Data Attribute Store (DAS) indicates that all clusters corresponding to a physical block has been deallocated, the block can be erased. This erasure may, for example, be performed as a background to further enhance performance.

The advantages of the invention are numerous. Different embodiments or implementations may yield one or more of the following advantages. It should be noted that this is not an exhaustive list and there may be other advantages which are not described herein. One advantage of the invention is that performance of non-volatile memory system can be improved. Another advantage of the invention is that it can be implemented using widely used conventions. Yet another advantage of the invention is that it can be implemented as a relatively small attribute table in flash-memory. Still another advantage is that the invention can be implemented for discretionary use and/or for use during background maintenance operations.

The various aspects or features of the invention described above can be used alone or in various combinations. The invention can also be implemented by hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The many features and advantages of the invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of performing garbage collection of data stored on a non-volatile memory storage device, said method comprising:
providing a Data Allocation Table (DAT) which includes a deallocation status for each one of a plurality of clusters used by a host to logically organize data;
monitoring a root directory, a File Allocation Table (FAT), and one or more subdirectories, to determine whether one or more sectors of one or more of said clusters have been deallocated;
updating said Data Allocation Table (DAT) based on said monitoring;
reading a deallocation status in said Data Allocation Table (DAT), wherein said deallocation status is associated with a first cluster that is stored as a first portion of a first block of non-volatile memory; and
copying one or more sectors of said first portion of said first block to a second block only when said deallocation status is set to allocated to indicate allocation of data to a file.

2. A method as recited in claim 1, wherein said monitoring, updating, reading, and copying are performed by a non-volatile memory controller.

3. A method as recited in claim 1,
wherein said data deallocation table is provided in non-volatile memory; and
wherein said data deallocation table includes an indexing mechanism provided to update said data deallocation table in non-volatile memory.

4. A memory device that provides non-volatile memory, wherein said memory device is capable of:
providing a data deallocation table which includes a deallocation status for each one of a plurality of clusters used by a host to logically organize data;
monitoring a root directory, a File Allocation Table (FAT), and one or more subdirectories to determine whether one or more of said clusters have been deallocated; and
updating said deallocation table based on said monitoring.

5. A memory device as recited in claim 4, wherein said memory device is further capable of:
reading a deallocation status associated with a first cluster that is stored as a first portion of a first block of non-volatile memory; and
copying said first portion of said first block to a second block only when said deallocation status is set to allocated.

6. A method for managing data stored in non-volatile memory, wherein said method comprises:
receiving data from a host, wherein said data is to be stored in non-volatile memory;
monitoring a File Allocation Table (FAT) used by said host to logically organize data stored in said non-volatile memory;
determining based on said monitoring whether one or more clusters which have been previously allocated to one or more files have been deallocated by said host; and
not copying data associated with said one or more clusters from one portion to another portion of said non-volatile memory when said determining determines that said one or more clusters have been deallocated by the host.

7. A method as recited in claim 6, wherein said method further comprises:
monitoring a root directory, one or more subdirectories, and a File Allocation Table (FAT).

8. A method as recited in claim 7, wherein said method further comprises:
generating an Attribute Store (AS) that includes at least one deallocation status about a plurality of data portions of data stored on said non-volatile memory; and
updating said Attribute Store (AS) based on said monitoring of said root directory, one or more subdirectories, and File Allocation Table (FAT).

9. A method as recited in claim 8,
wherein said Attribute Store (AS) further includes at least one deallocation status of one or more sectors of one or more clusters;
wherein said not coping of said one or more clusters comprises: not copying one or more sectors of said one or more clusters.

10. A method as recited in claim 9, wherein said Attribute Store (AS) is implemented as a Data Allocation Table (DAT).

11. A method as recited in claim 1;
wherein each clusters is represented by four (4) bits in said Data Allocation Table (DAT), and
wherein one (1) bit of said four bits represents an deallocation status that indicates whether the cluster if fully deallocated, and three (3) other bits of said four bits indicate what portion of the cluster has been deallocated.

12. A memory device that provides non-volatile memory, wherein said memory device is capable of:
providing a Data Allocation Table (DAT) which includes a deallocation status for each one of a plurality of clusters used by a host to logically organize data;

monitoring a root directory, a File Allocation Table (FAT), and one or more subdirectories, to determine whether one or more sectors of one or more of said clusters have been deallocated;

updating said Data Allocation Table (DAT) based on said monitoring, reading a deallocation status in said Data Allocation Table (DAT) after said updating, wherein said deallocation status is associated with a first cluster that is stored as a first portion of a first block of non-volatile memory; and copying one or more sectors of said first portion of said first block to a second block only when said deallocation status is set to allocated to indicate allocation of data to a file.

13. A computer readable medium storing computer program code for performing garbage collection of data stored on a non-volatile memory storage device, wherein said computer readable medium includes:

computer program code for providing a Data Allocation Table (DAT) which includes a deallocation status for each one of a plurality of clusters used by a host to logically organize data;

computer program code for monitoring a root directory, a File Allocation Table (FAT), and one or more subdirectories, to determine whether one or more sectors of one or more of said clusters have been deallocated;

computer program code for updating said Data Allocation Table (DAT) based on said monitoring;

computer program code for reading a deallocation status in said Data Allocation Table (DAT), wherein said deallocation status is associated with a first cluster that is stored as a first portion of a first block of non-volatile memory; and computer program code for copying one or more sectors of said first portion of said first block to a second block only when said deallocation status is set to allocated to indicate allocation of data to a file.

14. A computer-implemented method for managing data stored in a non-volatile memory device, said method comprising:

providing a data deallocation table which includes a deallocation status for each one of a plurality of clusters used by a host to logically organize data;

monitoring a root directory, a File Allocation Table (FAT), and one or more subdirectories to determine whether one or more of said clusters have been deallocated; and updating said deallocation table based on said monitoring.

15. A computer readable medium storing computer program code for managing data stored in a non-volatile memory device, wherein said computer readable medium includes:

computer program code for providing a data deallocation table which includes a deallocation status for each one of a plurality of clusters used by a host to logically organize data;

computer program code for monitoring a root directory, a File Allocation Table (FAT), and one or more subdirectories to determine whether one or more of said clusters have been deallocated; and computer program code for updating said deallocation table based on said monitoring.

16. A non-volatile memory device for storing and managing data stored therein, wherein said memory device is capable of:

receiving data from a host, wherein said data is to be stored in non-volatile memory of said non-volatile memory;

monitoring a File Allocation Table (FAT) stored on said non-volatile memory and used by said host to logically organize data on said non-volatile memory device;

determining based on said monitoring whether one or more clusters which have been previously allocated to one or more files have been deallocated by said host; and not copying data associated with said one or more clusters from one portion to another portion of said non-volatile memory when said determining determines that said one or more clusters have been deallocated.

17. A computer readable medium storing computer program code for storing and managing data stored in a non-volatile memory device, wherein said computer readable medium includes:

computer program code for receiving data from a host, wherein said data is to be stored in non-volatile memory of said non-volatile memory;

computer program code for monitoring a File Allocation Table (FAT) stored on said non-volatile memory and used by said host to logically organize data on said non-volatile memory device;

computer program code for determining based on said monitoring whether one or more clusters which have been previously allocated to one or more files have been deallocated by said host; and computer program code for not copying data associated with said one or more clusters from one portion to another portion of said non-volatile memory when said determining determines that said one or more clusters have been deallocated.

* * * * *